(12) United States Patent
Harada

(10) Patent No.: US 7,551,367 B2
(45) Date of Patent: Jun. 23, 2009

(54) WIDE-ANGLE LENS, OPTICAL APPARATUS AND METHOD FOR FOCUSING

(75) Inventor: Hiroki Harada, Zushi (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/172,178

(22) Filed: Jul. 11, 2008

(65) Prior Publication Data

US 2009/0015938 A1    Jan. 15, 2009

(30) Foreign Application Priority Data

Jul. 12, 2007    (JP) .............................. 2007-183302

(51) Int. Cl.
*G02B 15/14*    (2006.01)
*G02B 9/12*    (2006.01)
*G02B 3/02*    (2006.01)

(52) U.S. Cl. .................. 359/689; 359/784; 359/683; 359/684; 359/716; 359/900

(58) Field of Classification Search .................. 359/680, 359/682–684, 689, 708, 716, 784
See application file for complete search history.

(56) References Cited

U.S. PATENT DOCUMENTS 4,806,003 A    2/1989    Mukai et al.
7,164,543 B2 *    1/2007    Arai ........................... 359/689

FOREIGN PATENT DOCUMENTS

JP    63-061213 A    3/1988
JP    11-030743 A    2/1999

\* cited by examiner

*Primary Examiner*—William C Choi
*Assistant Examiner*—Jack Dinh
(74) *Attorney, Agent, or Firm*—Miles & Stockbridge P.C.

(57) ABSTRACT

Providing a wide-angle lens having high optical performance, an optical apparatus using the same, and a method for focusing the wide-angle lens. The lens comprising, in order from an object, a first lens group G1 having negative refractive power, a second lens group G2 having positive refractive power, and a third group G3 having positive refractive power. Upon focusing from an infinity object to a close object, the first lens group G1 is fixed, and the second lens group G2 and the third lens group G3 are moved to the object. Given conditional expressions are satisfied.

15 Claims, 7 Drawing Sheets

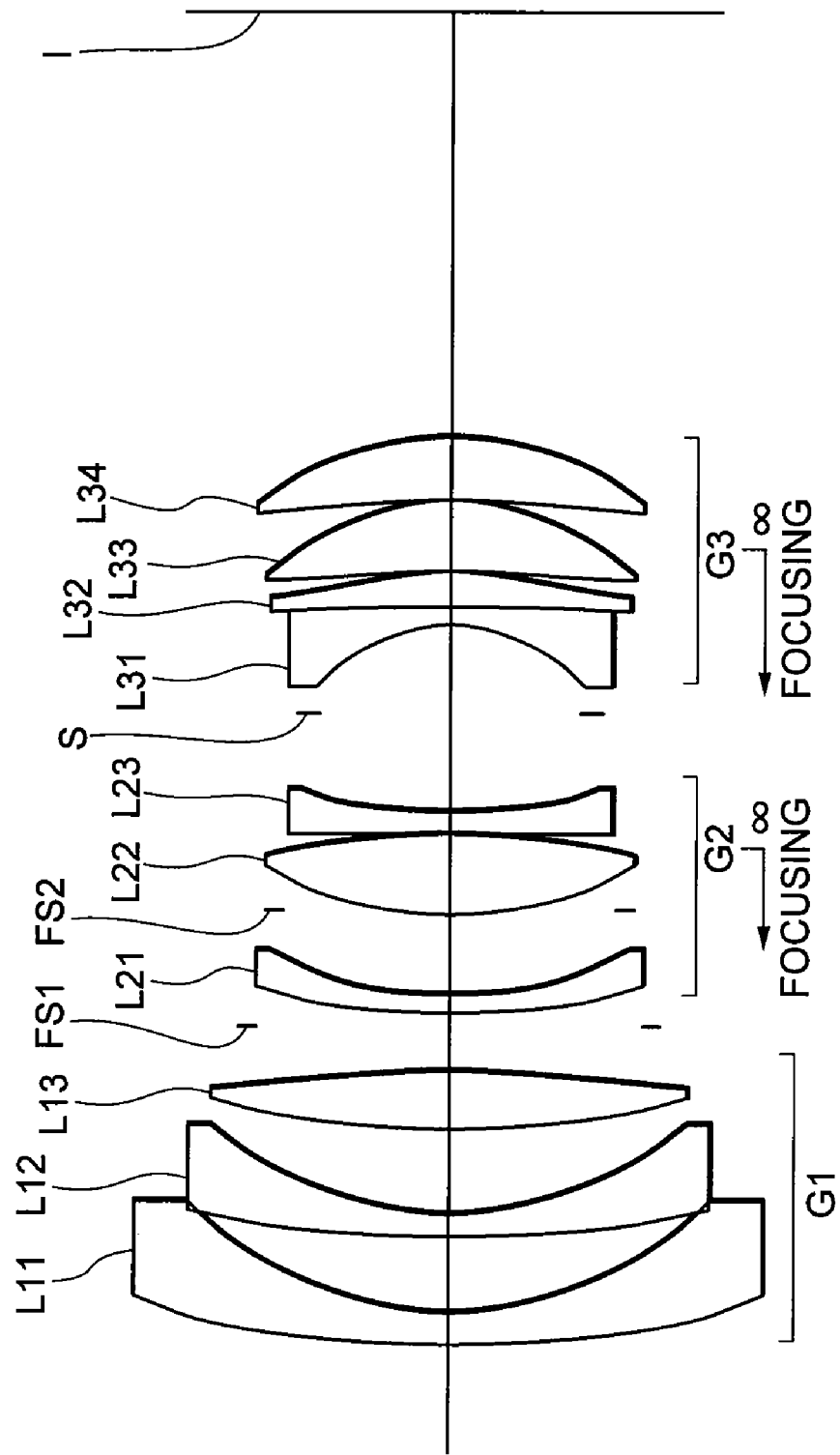

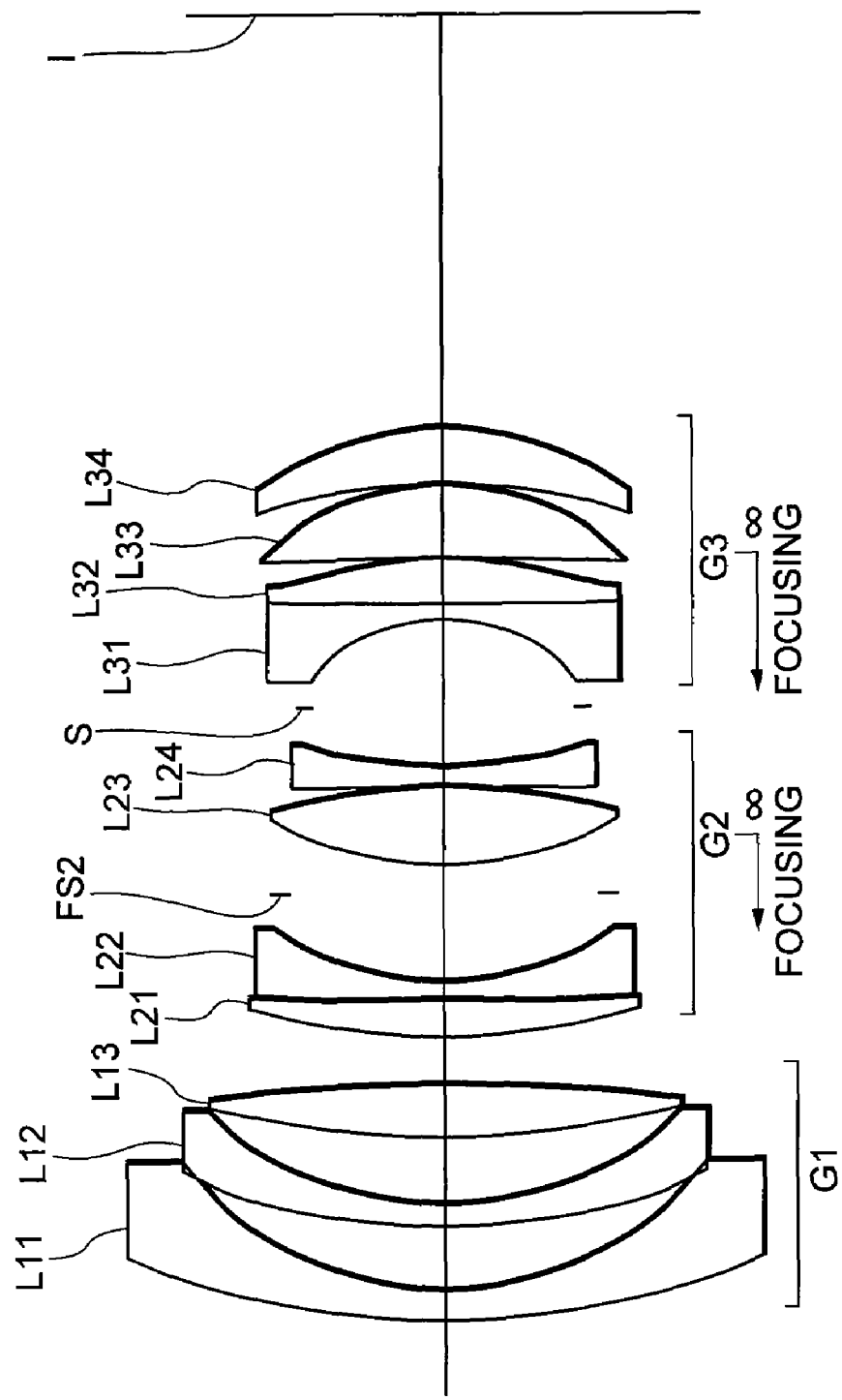

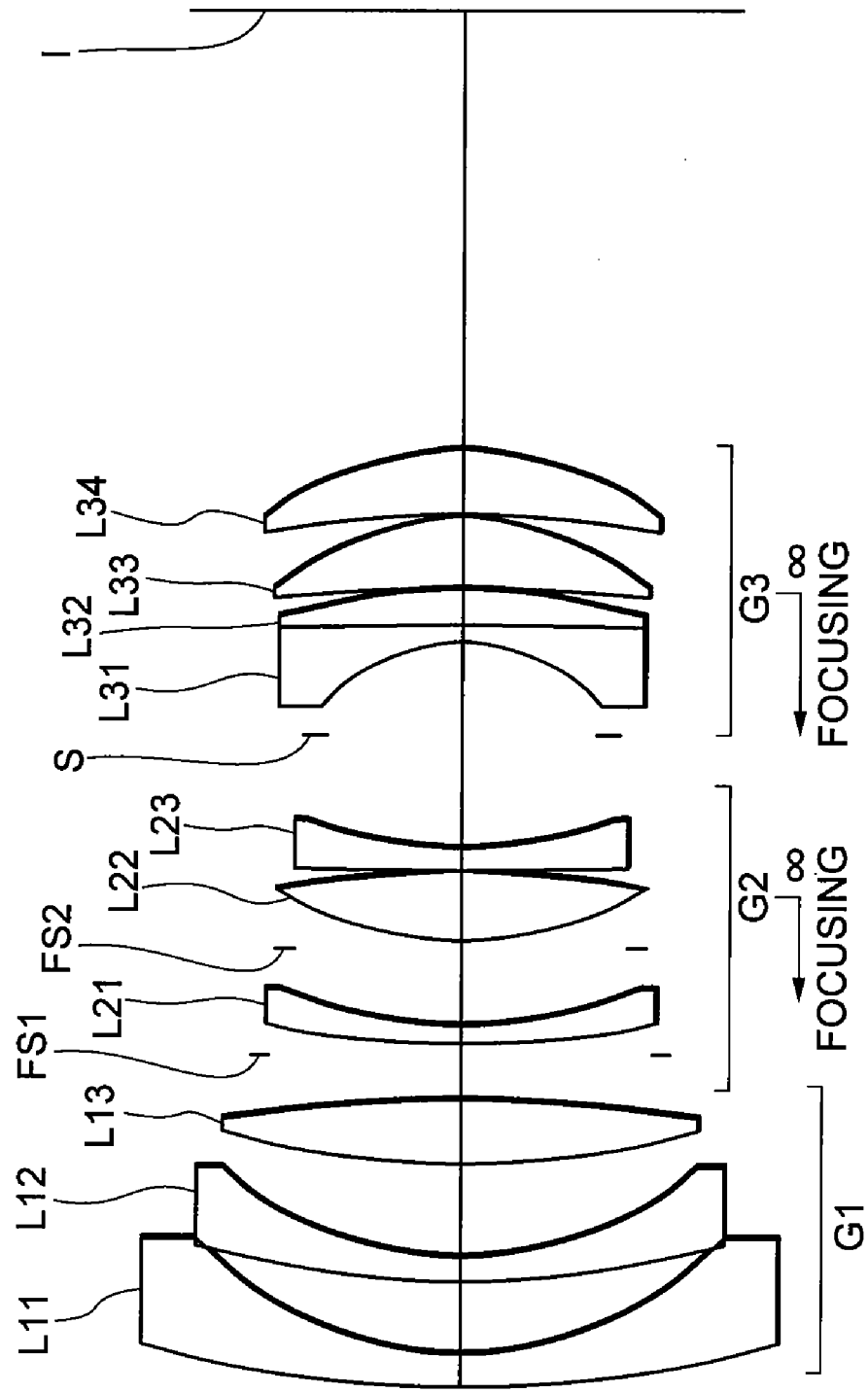

WIDE-ANGLE LENS, OPTICAL APPARATUS AND METHOD FOR FOCUSING

The disclosure of the following priority application is herein incorporated by reference:

Japanese Patent Application No. 2007-183302 filed on Jul. 12, 2007.

BACKGROUND OF THE INVENTION

1. Field of the Invention

The present invention relates to a wide-angle lens suitable for a single-lens reflex camera and a digital camera, an optical apparatus using the wide-angle lens, and a method for focusing the wide-angle lens.

2. Related Background Art

There has been proposed a retro-focus lens, in which a negative lens group comes to the most object side thereof, as a wide-angle lens securing a sufficient back focal length suitable for a single-lens reflex camera or a digital camera in spite of a short focal length thereof. In this type of a wide-angle lens, there has been proposed one having a large aperture ratio with an f-number of about 1.4 (for example, Japanese Patent Application Laid-Open No. 63-061213).

However, since power distribution of a retro-focus lens is asymmetric about an aperture stop thereof, astigmatism and coma tends to vary severely upon taking a picture of a close object in comparison with a picture of an object locating at infinity, so that it is difficult to construct a retro-focus lens to be a large aperture ratio. Moreover, since power distribution of a retro-focus lens is asymmetric such that the object side thereof is a negative lens group and the image side thereof is a positive lens group, it becomes extremely difficult to correct negative distortion and coma.

SUMMARY OF THE INVENTION

The present invention is made in view of the above-described problems, and has an object to provide a wide-angle lens having high optical performance, an optical apparatus equipped therewith, and a method for focusing the wide-angle lens.

According to a first aspect of the present invention, there is provided a wide-angle lens comprising, in order from an object: a first lens group having negative refractive power; a second lens group having positive refractive power; and a third lens group having positive refractive power; the first lens group including a positive lens; upon focusing from an infinity object to a close object, the first lens group being fixed, and the second lens group and the third lens group being moved to the object, and the following conditional expressions (1) and (2) being satisfied:

$$1.10 < -f1/f2 < 1.50 \quad (1)$$

$$1.80 < n1p \quad (2)$$

where f1 denotes a focal length of the first lens group, f2 denotes a focal length of the second lens group, and n1p denotes a refractive index of the positive lens in the first lens group at d-line in which wavelength $\lambda = 587.6$ nm.

According to a second aspect of the present invention, there is provided an optical apparatus equipped with the wide-angle lens according to the first aspect.

According to a third aspect of the present invention, there is provided a method for focusing a wide-angle lens comprising steps of: providing the wide-angle lens including, in order from an object, a first lens group having negative refractive power, a second lens group having positive refractive power, and a third lens group having positive refractive power, the first lens group including a positive lens, the following conditional expressions (1) and (2) being satisfied:

$$1.10 < -f1/f2 < 1.50 \quad (1)$$

$$1.80 < n1p \quad (2)$$

where f1 denotes a focal length of the first lens group, f2 denotes a focal length of the second lens group, and n1p denotes a refractive index of the positive lens in the first lens group at d-line in which wavelength $\lambda = 587.6$ nm; and carrying out focusing from an infinity object to a close object by fixing the first lens group and moving the second lens group and the third lens group to the object.

The present invention makes it possible to provide a wide-angle lens having high optical performance, an optical apparatus using the same, and a method for focusing the wide-angle lens.

BRIEF DESCRIPTION OF THE DRAWINGS

FIG. 1 is a sectional view showing a lens configuration of a wide-angle lens according to Example 1 of the present embodiment.

FIGS. 2A, 2B and 2C are graphs showing various aberrations of the wide-angle lens according to Example 1, in which FIG. 2A shows upon focusing on infinity ($\beta=0.00$), FIG. 2B shows upon focusing on an object locating at an intermediate distance ($\beta=-0.033$), and FIG. 2C shows upon focusing on an object locating at the closest distance ($\beta=-0.20$).

FIG. 3 is a sectional view showing a lens configuration of a wide-angle lens according to Example 2 of the present embodiment.

FIGS. 4A, 4B and 4C are graphs showing various aberrations of the wide-angle lens according to Example 2, in which FIG. 4A shows upon focusing on infinity ($\beta=0.00$), FIG. 4B shows upon focusing on an object locating at an intermediate distance ($\beta=-0.033$), and FIG. 4C shows upon focusing on an object locating at the closest distance ($\beta=-0.20$).

FIG. 5 is a sectional view showing a lens configuration of a wide-angle lens according to Example 3 of the present embodiment.

FIGS. 6A, 6B and 6C are graphs showing various aberrations of the wide-angle lens according to Example 3, in which FIG. 6A shows upon focusing on infinity ($\beta=0.00$), FIG. 6B shows upon focusing on an object locating at an intermediate distance ($\beta=-0.033$), and FIG. 6C shows upon focusing on an object locating at the closest distance ($\beta=-0.20$).

DESCRIPTION OF THE MOST PREFERRED EMBODIMENT

Figure 2A:
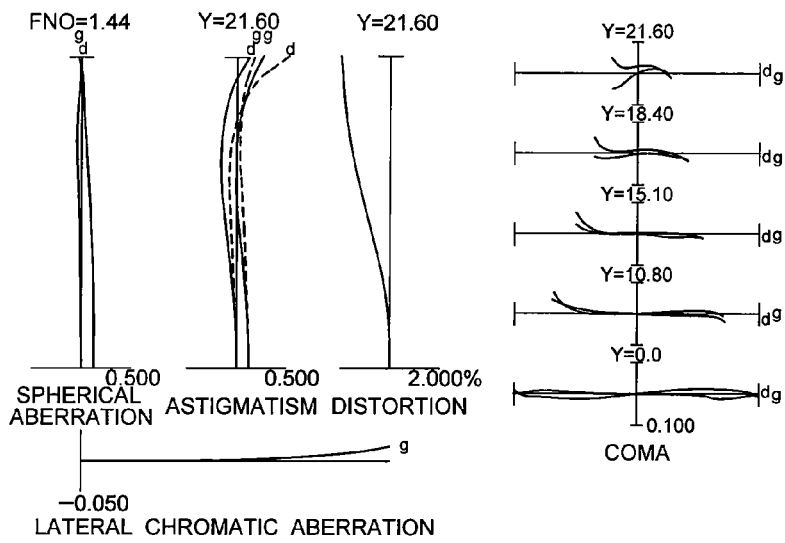

A wide-angle lens according to the present embodiment is explained below.

A wide-angle lens according to the present embodiment includes, in order from an object, a first lens group having negative refractive power, a second lens group having positive refractive power, and a third lens group having positive refractive power. The first lens group has a positive lens. Upon focusing from an infinity object to a close object, the first lens group is fixed, and the second lens group and the third lens group are moved to the object. The following conditional expressions (1), (2) and (3) are satisfied:

$$1.10 < -f1/f2 < 1.50 \quad (1)$$

$$1.80 < n1p \quad (2)$$

$$30.00 < v1p \quad (3)$$

where f1 denotes a focal length of the first lens group, f2 denotes a focal length of the second lens group, n1p denotes a refractive index of the positive lens in the first lens group at d-line in which wavelength λ=587.6 nm, and v1p denotes an Abbe number of the positive lens in the first lens group at d-line in which wavelength λ=587.6 nm.

Conditional expression (1) defines an appropriate range of a ratio of refractive power of the first lens group to that of the second lens group.

When the ratio −f1/f2 is equal to or exceeds the upper limit of conditional expression (1), refractive power of the second lens group becomes strong, a light flux diverged by the first lens group is abruptly converged by the second lens group, so that spherical aberration and coma are largely generated. On the other hand, when the ratio −f1/f2 is equal to or falls below the lower limit of conditional expression (1), refractive power of the third lens group becomes large so as to compensate a shortage of refractive power of the second lens group, so that spherical aberration and coma become large in the third lens group.

With satisfying conditional expression (1), it becomes possible to excellently correct spherical aberration and coma.

In order to secure the effect of the present embodiment, it is preferable to set the lower limit of conditional expression (1) to 1.15. In order to further secure the effect of the present embodiment, it is most preferable to set the lower limit of conditional expression (1) to 1.20. In order to secure the effect of the present embodiment, it is preferable to set the upper limit of conditional expression (1) to 1.45. In order to further secure the effect of the present embodiment, it is most preferable to set the upper limit of conditional expression (1) to 1.40.

Conditional expressions (2) and (3) are for excellently correcting negative lateral chromatic aberration with suppressing negative distortion and coma.

Negative distortion and coma generated in a negative lens group can be mitigated by introducing a positive lens with a high refractive index into the negative lens group. However, a glass material with a high refractive index usually has large dispersion, in other words, a small Abbe number, so that a generating amount of lateral chromatic aberration with respect to an image height of a negative lens differs from that of a positive lens such that negative lateral chromatic aberration tends to generate in an intermediate image height state, and positive lateral chromatic aberration tends to drastically generate in a higher image height state.

When the value n1p is equal to or falls below the lower limit of conditional expression (2), it generally becomes easy to choose a glass material with a large Abbe number, so that it becomes easy to correct lateral chromatic aberration. However, it becomes impossible to correct distortion and coma generated in the negative lens.

In order to secure the effect of the present embodiment, it is preferable to set the lower limit of conditional expression (2) to 1.84. In order to further secure the effect of the present embodiment, it is most preferable to set the lower limit of conditional expression (2) to 1.90.

When the value v1p is equal to or falls below the lower limit of conditional expression (3), it generally becomes easy to select a glass material having a high refractive index, so that distortion and coma are easily corrected. However, when an Abbe number is equal to or falls below the lower limit, a so-called secondary dispersion value of the glass material becomes drastically large, so that lateral chromatic aberration cannot be corrected enough.

In order to secure the effect of the present embodiment, it is preferable to set the lower limit of conditional expression (3) to 31.00. In order to further secure the effect of the present embodiment, it is most preferable to set the lower limit of conditional expression (3) to 32.00.

In a wide-angle lens according to the present embodiment, an aperture stop S is preferably disposed between the second lens group and the third lens group. With this configuration, it becomes possible to suppress variation in spherical aberration and coma upon focusing.

In a wide-angle lens according to the present embodiment, it is preferable that the second lens group and the third lens group are moved to the object with different moving amounts with each other upon focusing from an infinity object to a close object, and the following conditional expression (4) is preferably satisfied:

$$1.10 < \Delta 3/\Delta 2 < 1.50 \quad (4)$$

where Δ3 denotes the moving amount of the third lens group, and Δ2 denotes the moving amount of the second lens group.

Conditional expression (4) is for suppressing variation in aberrations upon focusing from an infinity object to a close object.

Aberrations increasing upon focusing from an infinity object to a close object are mainly spherical aberration, coma and astigmatism. Such aberrations can be excellently corrected by decreasing a distance between the second lens group and the aperture stop S, in other words, a distance between the second lens group and the third lens group upon focusing from an infinity object to a close object. Conditional expression (4) defines a degree of reduction in the distance between the second lens group and the third lens group by defining a ratio of moving speed of the second lens group to that of the third lens group.

When the ratio Δ3/Δ2 is equal to or falls below the lower limit of conditional expression (4), the distance between the second lens group and the third lens group is almost the same or increases, so that it becomes difficult to correct aberrations such as spherical aberration, coma and astigmatism by reducing the distance between the lens groups. On the other hand, when the ratio Δ3/Δ2 is equal to or exceeds the upper limit of conditional expression (4), the moving amount of the third lens group becomes too large resulting in overcorrection of aberrations, so that aberrations such as spherical aberration, coma and astigmatism become worse.

In order to secure the effect of the present embodiment, it is preferable to set the lower limit of conditional expression (4) to 1.20. In order to further secure the effect of the present embodiment, it is most preferable to set the lower limit of conditional expression (4) to 1.25. In order to secure the effect of the present embodiment, it is preferable to set the upper limit of conditional expression (4) to 1.45. In order to further secure the effect of the present embodiment, it is most preferable to set the upper limit of conditional expression (4) to 1.40.

In a wide-angle lens according to the present embodiment, the following conditional expressions (5) and (6) are preferably satisfied:

$$1.50 < -f1/f3 < 3.40 \quad (5)$$

$$1.50 < f2/f3 < 3.00 \quad (6)$$

where f3 denotes a focal length of the third lens group.

Conditional expression (5) defines a ratio between refractive power of the first lens group and that of the third lens group.

When the ratio −f1/f3 is equal to or falls below the lower limit of conditional expression (5), refractive power of the first lens group becomes too large, so that coma and astigmatism become worse. On the other hand, when the ratio −f1/f3 is equal to or exceeds the upper limit of conditional expression (5), refractive power ratio between the third lens group with positive refractive power and the first lens group with negative refractive power becomes asymmetrically large. Accordingly, distortion, coma and lateral chromatic aberration become worse.

In order to secure the effect of the present embodiment, it is preferable to set the lower limit of conditional expression (5) to 2.00. In order to further secure the effect of the present embodiment, it is most preferable to set the lower limit of conditional expression (5) to 2.50. In order to secure the effect of the present embodiment, it is preferable to set the upper limit of conditional expression (5) to 3.30. In order to further secure the effect of the present embodiment, it is most preferable to set the upper limit of conditional expression (5) to 3.10.

Conditional expression (6) defines refractive power ratio between the second lens group and the third lens group.

When the ratio f2/f3 is equal to or falls below the lower limit of conditional expression (6), refractive power of the second lens group becomes excessively large, so that coma and astigmatism becomes worse. On the other hand, when the ratio f2/f3 is equal to or exceeds the upper limit of conditional expression (6), refractive power of the third lens group becomes excessively large, so that spherical aberration, which is allotted mainly to the third lens group, becomes drastically worse.

In order to secure the effect of the present embodiment, it is preferable to set the lower limit of conditional expression (6) to 2.00. In order to further secure the effect of the present embodiment, it is most preferable to set the lower limit of conditional expression (6) to 2.15. In order to secure the effect of the present embodiment, it is preferable to set the upper limit of conditional expression (6) to 2.50. In order to further secure the effect of the present embodiment, it is most preferable to set the upper limit of conditional expression (6) to 2.40.

In a wide-angle lens according to the present embodiment, at least one of the second lens group and the third lens group includes an aspherical surface. With this configuration, it becomes possible to reduce distortion and curvature of field.

In a wide-angle lens according to the present embodiment, the second lens group has a positive lens, and the following conditional expressions (7) and (8) are preferably satisfied:

$$1.90 < n2p \qquad (7)$$

$$30.00 < v2p \qquad (8)$$

where n2p denotes a refractive index of the positive lens in the second lens group at d-line in which wavelength λ=587.6 nm, and v2p denotes an Abbe number of the positive lens in the second lens group at d-line in which wavelength λ=587.6 nm.

With including the positive lens, which satisfies both of conditional expressions (7) and (8), in the second lens group, it is more effective for correcting distortion, curvature of field and coma than conditional expressions (2) and (3).

When the value n2p is equal to or falls below the lower limit of conditional expression (7), it generally becomes easy to choose a glass material with a large Abbe number so that lateral chromatic aberration can easily be corrected. However, it becomes impossible to correct distortion and coma generated in the negative lens.

When the value v2p is equal to or falls below the lower limit of conditional expression (8), it generally becomes easy to select a glass material having a high refractive index, so that distortion and coma are easily corrected. However, when the Abbe number is equal to the lower limit or less, a so-called secondary dispersion value of the glass material becomes drastically large, so that lateral chromatic aberration cannot be sufficiently corrected.

In a wide-angle lens according to the present embodiment, the following conditional expression (9) is preferably satisfied:

$$1.90 < n1p \qquad (9).$$

With satisfying conditional expression (9), aberration correction can be carried out more excellently than conditional expression (2).

Each example according to the present embodiment is explained below with reference to accompanying drawings.

Example 1

FIG. 1 is a sectional view showing a lens configuration of a wide-angle lens according to Example 1 of the present embodiment.

The wide-angle lens according to Example 1 is composed of, in order from an object along an optical axis, a first lens group G1 having negative refractive power, a second lens group G2 having positive refractive power, and a third lens group having positive refractive power.

Upon focusing from an infinity object to a close object, the first lens group G1 is fixed, and the second lens group G2 and the third lens group G3 are moved to the object with different respective speeds.

The first lens group G1 is composed of, in order from the object, a negative meniscus lens L11 having a convex surface facing the object, a negative meniscus lens L12 having a convex surface facing the object, and a double convex positive lens L13. The image plane I side of the negative meniscus lens L11 is an aspherical surface.

The second lens group G2 is composed of, in order from the object, a negative meniscus lens L21 having a convex surface facing the object, a double convex positive lens L22, and a double concave negative lens L23.

The third lens group G3 is composed of, in order from the object, a cemented lens constructed by a negative meniscus lens L31 having a convex surface facing the image plane I cemented with a positive meniscus lens L32 having a convex surface facing the image plane I, a positive meniscus lens L33 having a convex surface facing the image plane I, and a positive meniscus lens L34 having a convex surface facing the image plane I. The image plane I side surface of the positive meniscus lens L32 is an aspherical surface.

The positive lens L13 in the first lens group is a positive lens having a refractive index of 1.80 or more and an Abbe number of 30.00 or more.

A first flare stopper FS1 is disposed between the first lens group G1 and the second lens group G2, a second flare stopper FS2 is disposed in the vicinity of the positive lens L22, and an aperture stop S is disposed between the second lens group G2 and the third lens group G3.

Various values associated with the wide-angle lens according to Example 1 are listed in Table 1.

In [Lens Data], the left most column "i" shows the lens surface number counted in order from the object side, the second column "r" shows a radius of curvature of the lens surface, the third column "d" shows a distance to the next surface, the fourth column "nd" shows a refractive index of the material at d-line (wavelength λ=587.6 nm), and the fifth column "vd" shows an Abbe number of the material at d-line (wavelength λ=587.6 nm). In the fifth column "nd" the refractive index of the air nd=1.000000 is omitted. In the second column "r", r=∞ denotes a plane surface. In the third column "d", Bf denotes a back focal length.

In [Aspherical Data], an aspherical surface is exhibited by the following expression:

$$X(y)=(y^2/r)/[1+[1-\kappa(y^2/r^2)]^{1/2}]+A4 \times y^4+A6 \times y^6+A8 \times y^8+A10 \times y^{10}+A12 \times y^{12}$$

where y denotes a vertical height from the optical axis, X(y) denotes a sag amount which is a distance along the optical axis from the tangent surface at the vertex of the aspherical surface to the aspherical surface at the vertical height y from the optical axis, r denotes a radius of curvature of a reference sphere (a paraxial radius of curvature), K denotes a conical coefficient, An denotes aspherical coefficient of n-th order, "E-n" denotes "$\times 10^{-n}$", for example, "1.234E-05" denotes "$1.234 \times 10^{-5}$" and the position of an aspherical surface is expressed by attaching "*" to the right side of the surface number.

In [Specifications], f denotes a focal length of the wide-angle lens, FNO denotes an f-number, 2ω denotes an angle of view in degrees, y denotes an image height, TL denotes a total lens length, and Bf denotes a back focal length.

In [Variable Distances], "Infinity" denotes a case upon focusing on an object locating at infinity, "Intermediate" denotes a case upon focusing on an object locating at an intermediate distance, "Closest" denotes a case focusing on an object locating at the closest distance, di denotes a variable distance at the surface number i, and β denotes imaging magnification.

In the tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples, so that duplicated explanations are omitted.

TABLE 1

[Lens Data]

| i | r | d | nd | vd |
|---|---|---|---|---|
| 1 | 84.241 | 2.80 | 1.772499 | 49.60 |
| 2* | 29.000 | 6.93 | | |
| 3 | 89.022 | 2.30 | 1.754998 | 52.32 |
| 4 | 32.000 | 7.50 | | |
| 5 | 67.193 | 5.56 | 1.901355 | 31.55 |
| 6 | −183.632 | (d6) | | |
| 7 | ∞ | 0.72 | FS1 | |
| 8 | 50.462 | 1.70 | 1.729157 | 54.68 |
| 9 | 31.529 | 8.36 | | |
| 10 | ∞ | −1.00 | FS2 | |
| 11 | 29.731 | 7.37 | 1.804000 | 46.57 |
| 12 | −91.413 | 0.20 | | |
| 13 | −4167.443 | 1.89 | 1.717362 | 29.52 |
| 14 | 40.421 | (d14) | | |
| 15 | ∞ | 8.18 | Aperture Stop S | |
| 16 | −16.352 | 1.50 | 1.805181 | 25.46 |
| 17 | −1456.241 | 3.01 | 1.816000 | 46.62 |
| 18* | −40.911 | 0.15 | | |
| 19 | −250.388 | 6.50 | 1.618000 | 63.33 |
| 20 | −24.683 | 0.15 | | |
| 21 | −133.591 | 5.50 | 1.772499 | 49.60 |
| 22 | −30.008 | (Bf) | | |

[Aspherical Data]

Surface Number: 2

K = 9.256E−01
A4 = −2.026E−06
A6 = −2.592E−09
A8 = 1.220E−12
A10 = −4.405E−15
A12 = 0.000E+00

Surface Number: 18

K = 9.140E−01
A4 = 1.969E−05
A6 = 9.863E−09
A8 = 2.937E−11
A10 = −3.136E−13
A12 = 4.395E−16

[Specifications]

f = 24.70
FNO = 1.44
2ω = 82.34
Y = 21.60
TL = 121.57
Bf = 38.50

[Variable Distances]

| | Infinity | Intermediate | Closest |
|---|---|---|---|
| β | 0.00 | −0.0333 | −0.20 |
| d6 | 4.34 | 3.61 | 0.44 |
| d14 | 9.42 | 9.28 | 8.06 |

[Values for Conditional Expressions]

(1): −f1/f2 = 1.36
(2): n1p = 1.901
(3): ν1p = 31.6
(4): Δ3/Δ2 = 1.35
(5): −f1/f3 = 3.09
(6): f2/f3 = 2.27
(9): n1p = 1.901

Figure 2B:
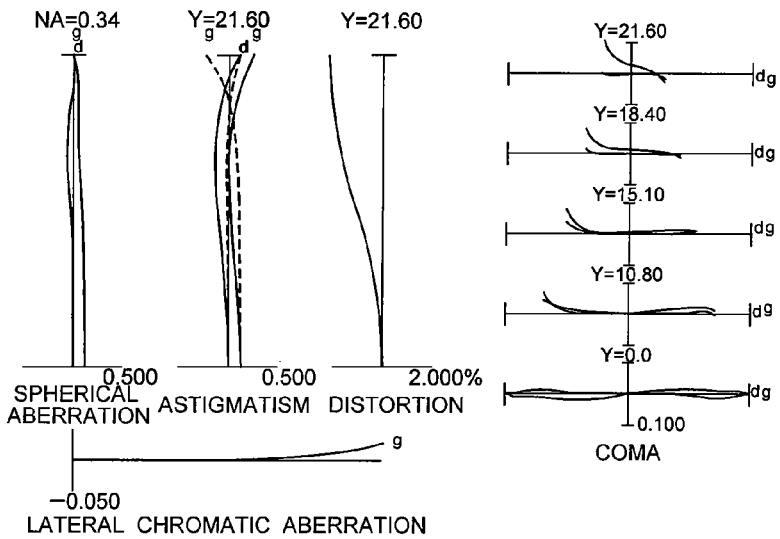
Figure 2C:
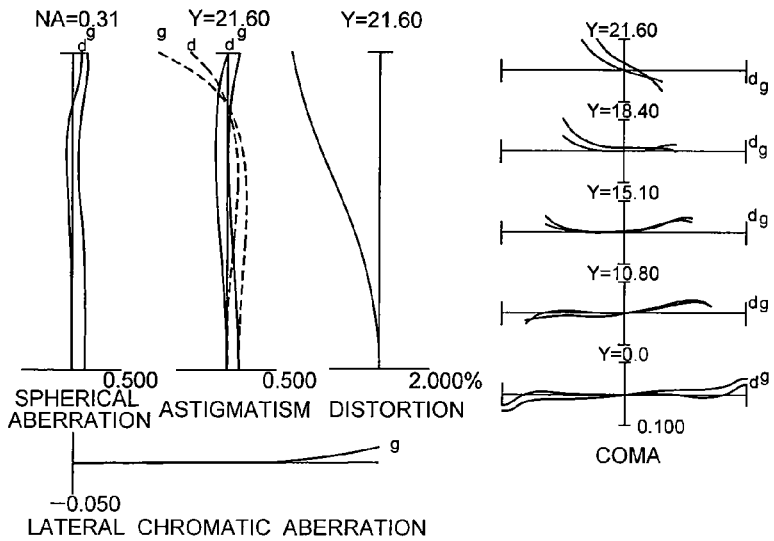

FIGS. 2A, 2B and 2C are graphs showing various aberrations of the wide-angle lens according to Example 1, in which FIG. 2A shows upon focusing on infinity (β=0.00), FIG. 2B shows upon focusing on an object locating at an intermediate distance (β=−0.033), and FIG. 2C shows upon focusing on an object locating at the closest distance (β=−0.20).

In respective graphs, FNO denotes an f-number, Y denotes an image height, and NA denotes a numerical aperture. In graphs showing spherical aberration, f-number with respect to the maximum aperture or the maximum numerical aperture is shown. In graphs showing astigmatism and distortion, the maximum value of the image height is shown. In graphs showing coma, coma with respect to each image height is shown. In respective graphs, d denotes aberration curve at d-line (wavelength λ=587.6 nm), and g denotes aberration curve at g-line (wavelength λ=435.8 nm). In graphs showing astigmatism, a solid line indicates a sagittal image plane, and a broken line indicates a meridional image plane. The above-described explanations regarding various aberration graphs are the same as the other Examples.

As is apparent from the respective graphs, the wide-angle lens according to Example 1 shows superb optical performance as a result of good corrections to various aberrations.

Example 2

FIG. 3 is a sectional view showing a lens configuration of a wide-angle lens according to Example 2 of the present embodiment.

The wide-angle lens according to Example 2 is composed of, in order from an object along an optical axis, a first lens group G1 having negative refractive power, a second lens group G2 having positive refractive power, and a third lens group G3 having positive refractive power.

Upon focusing from an infinity object to a close object, the first lens group G1 is fixed, and the second lens group G2 and the third lens group G3 are moved to the object with different respective speeds.

The first lens group G1 is composed of, in order from the object, a negative meniscus lens L11 having a convex surface facing the object, a negative meniscus lens L12 having a convex surface facing the object, and a double convex positive lens L13. The image plane I side of the negative meniscus lens L11 is an aspherical surface.

The second lens group G2 is composed of, in order from the object, a cemented lens constructed by a positive meniscus lens L21 having a convex surface facing the object cemented with a negative meniscus lens L22 having a convex surface facing the object, a double convex positive lens L23, and a negative meniscus lens L24 having a convex surface facing the object.

The third lens group G3 is composed of, in order from the object, a cemented lens constructed by a double concave negative lens L31 cemented with a double convex positive lens L32, a positive meniscus lens L33 having a convex surface facing the image plane I side, and a positive meniscus lens L34 having a convex surface facing the image plane I side. The image plane I side surface of the positive lens L32 is an aspherical surface.

The positive lens L13 in the first lens group G1 is a positive lens having a refractive index of 1.80 or more and an Abbe number of 30.00 or more. The positive meniscus lens L21 in the second lens group G2 is a positive lens having a refractive index of 1.90 or more and an Abbe number of 30.00 or more.

A flare stopper FS is disposed between the negative meniscus lens L22 and the positive lens L23. An aperture stop S is disposed between the second lens group G2 and the third lens group G3.

Various values associated with the wide-angle lens according to Example 2 are listed in Table 2.

TABLE 2

[Lens Data]

| i | r | d | nd | vd |
|---|---|---|----|-----|
| 1 | 73.812 | 2.80 | 1.772499 | 49.60 |
| 2* | 29.000 | 5.87 | | |
| 3 | 56.928 | 2.30 | 1.729157 | 54.68 |
| 4 | 32.000 | 6.26 | | |
| 5 | 77.289 | 5.05 | 1.800999 | 34.97 |
| 6 | −244.950 | (d6) | | |
| 7 | 57.547 | 3.44 | 1.901355 | 31.55 |
| 8 | 270.193 | 1.70 | 1.729157 | 54.68 |
| 9 | 25.957 | 8.74 | | |
| 10 | ∞ | 2.50 | FS | |
| 11 | 30.507 | 7.37 | 1.804000 | 46.57 |
| 12 | −67.379 | 0.20 | | |
| 13 | 1489.766 | 1.89 | 1.717362 | 29.52 |
| 14 | 39.615 | (d14) | | |
| 15 | ∞ | 8.18 | Aperture Stop S | |
| 16 | −16.623 | 1.50 | 1.805181 | 25.46 |
| 17 | 369.054 | 4.22 | 1.834807 | 42.71 |
| 18* | −34.218 | 0.15 | | |
| 19 | −1373.189 | 7.01 | 1.618000 | 63.33 |
| 20 | −24.573 | 0.15 | | |
| 21 | −59.388 | 5.10 | 1.772499 | 49.60 |
| 22 | −29.749 | (Bf) | | |

[Aspherical Data]

Surface Number: 2

K = 9.256E−01
A4 = −2.026E−06
A6 = −2.592E−09
A8 = 1.220E−12
A10 = −4.405E−15
A12 = 0.000E+00

Surface Number: 18

K = 9.140E−01
A4 = 1.969E−05
A6 = 9.863E−09
A8 = 2.937E−11
A10 = −3.136E−13
A12 = 4.395E−16

[Specifications]

f = 24.70
FNO = 1.44
2ω = 82.34
Y = 21.60
TL = 124.29
Bf = 39.37

[Variable Distances]

| | Infinity | Intermediate | Closest |
|---|---|---|---|
| β | 0.00 | −0.0333 | −0.16 |
| d6 | 4.54 | 3.80 | 1.61 |
| d14 | 5.95 | 5.84 | 4.78 |

[Values for Conditional Expressions]

(1): −f1/f2 = 1.25
(2): n1p = 1.801
(3): ν1p = 35.0
(4): Δ3/Δ2 = 1.40
(5): −f1/f3 = 2.87
(6): f2/f3 = 2.30
(7): n2p = 1.901
(8): ν2p = 31.6
(9): n1p = 1.801

Figure 4A:
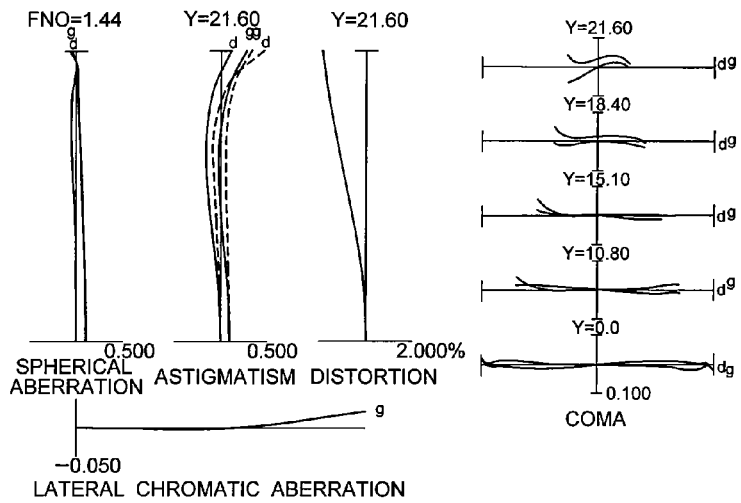
Figure 4B:
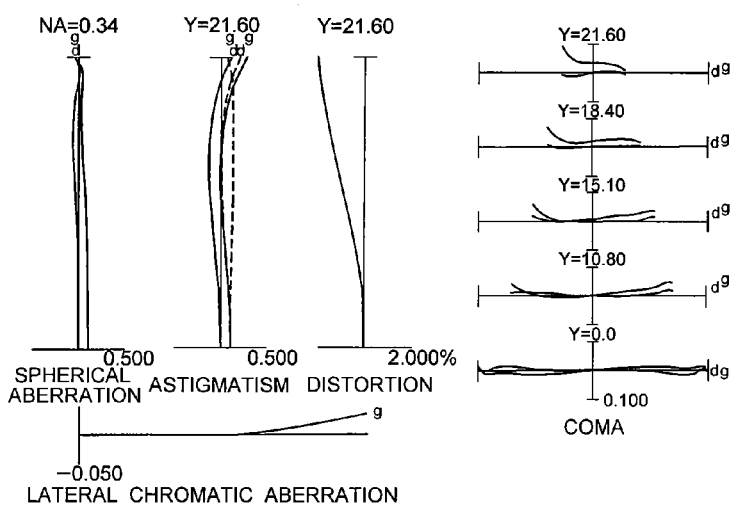
Figure 4C:
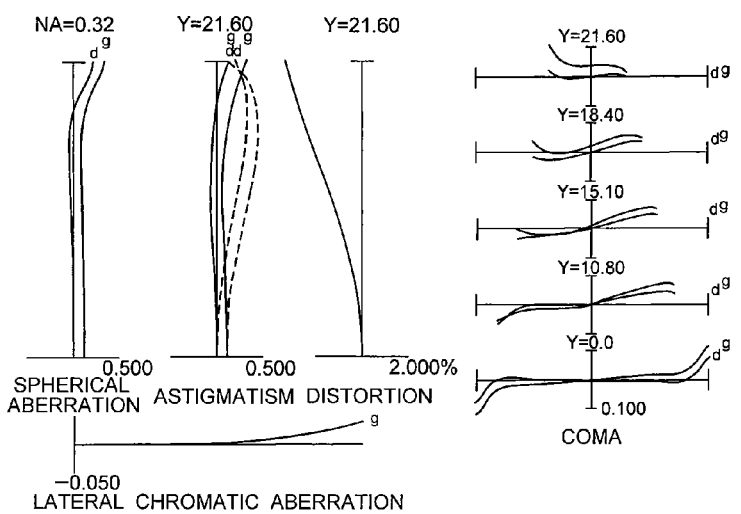

FIGS. 4A, 4B and 4C are graphs showing various aberrations of the wide-angle lens according to Example 2, in which FIG. 4A shows upon focusing on infinity (β=0.00), FIG. 4B shows upon focusing on an object locating at an intermediate distance (β=−0.033), and FIG. 4C shows upon focusing on an object locating at the closest distance (β=−0.20).

As is apparent from the respective graphs, the wide-angle lens according to Example 2 shows superb optical performance as a result of good corrections to various aberrations.

Example 3

FIG. 5 is a sectional view showing a lens configuration of a wide-angle lens according to Example 3 of the present embodiment.

The wide-angle lens according to Example 3 is composed of, in order from an object along an optical axis, a first lens group G1 having negative refractive power, a second lens group G2 having positive refractive power, and a third lens group having positive refractive power.

Upon focusing from an infinity object to a close object, the first lens group G1 is fixed, and the second lens group G2 and the third lens group G3 are moved to the object with different respective speeds.

The first lens group G1 is composed of, in order from the object, a negative meniscus lens L11 having a convex surface facing the object, a negative meniscus lens L12 having a convex surface facing the object, and a double convex positive lens L13. The image plane I side of the negative meniscus lens L11 is an aspherical surface.

The second lens group G2 is composed of, in order from the object, a negative meniscus lens L21 having a convex surface facing the object, a double convex positive lens L22, and a negative meniscus lens L23 having a convex surface facing the object. The object side lens surface of the positive lens L22 is an aspherical surface.

The third lens group G3 is composed of, in order from the object, a cemented lens constructed by a double concave negative lens L31 cemented with a double convex positive lens L32, a positive meniscus lens L33 having a convex surface facing the image plane I, and a positive meniscus lens L34 having a convex surface facing the image plane I. The image plane I side surface of the positive meniscus lens L32 is an aspherical surface.

The positive lens L13 in the first lens group is a positive lens having a refractive index of 1.80 or more and an Abbe number of 30.00 or more.

A first flare stopper FS1 is disposed between the first lens group G1 and the second lens group G2, a second flare stopper FS2 is disposed between the negative meniscus lens L21 and the positive lens L22, and an aperture stop S is disposed between the second lens group G2 and the third lens group G3.

Various values associated with the wide-angle lens according to Example 3 are listed in Table 3.

TABLE 3

[Lens Data]

| i | r | d | nd | vd |
|---|---|---|---|---|
| 1 | 98.850 | 2.80 | 1.772499 | 49.60 |
| 2* | 29.000 | 6.17 | | |
| 3 | 76.080 | 2.30 | 1.754998 | 52.32 |
| 4 | 32.000 | 8.00 | | |
| 5 | 69.050 | 5.55 | 1.903660 | 31.31 |
| 6 | −171.850 | (d6) | | |
| 7 | ∞ | 0.72 | FS1 | |
| 8 | 74.740 | 1.70 | 1.729157 | 54.68 |
| 9 | 40.870 | 7.07 | | |
| 10 | ∞ | 0.31 | FS2 | |
| 11* | 29.140 | 6.20 | 1.804000 | 46.57 |
| 12 | −108.250 | 0.20 | | |
| 13 | 404.360 | 1.89 | 1.717362 | 29.52 |
| 14 | 36.160 | (d14) | | |
| 15 | ∞ | 8.18 | Aperture Stop S | |
| 16 | −16.690 | 1.50 | 1.805181 | 25.46 |
| 17 | 12374.110 | 3.13 | 1.816000 | 46.62 |
| 18* | −40.070 | 0.15 | | |
| 19 | −240.690 | 6.38 | 1.618000 | 63.33 |
| 20 | −25.410 | 0.15 | | |
| 21 | −123.660 | 5.88 | 1.772499 | 49.60 |
| 22 | −29.770 | (Bf) | | |

TABLE 3-continued

[Aspherical Data]

Surface Number: 2

K = 8.546E−01
A4 = −2.482E−06
A6 = −1.689E−09
A8 = 7.351E−14
A10 = 7.351E−14
A12 = 0.000E+00

Surface Number: 11

K = 9.049E−01
A4 = −8.887E−07
A6 = −3.422E−10
A8 = 0.000E+00
A10 = 0.000E+00
A12 = 0.000E+00

Surface Number: 18

K = 1.033E+00
A4 = 1.932E−05
A6 = 1.063E−08
A8 = 4.090E−11
A10 = −3.551E−13
A12 = 5.184E−16

[Specifications]

f = 24.70
FNO = 1.44
2ω = 82.34
Y = 21.60
TL = 121.28
Bf = 38.50

[Variable Distances]

| | Infinity | Intermediate | Closest |
|---|---|---|---|
| β | 0.00 | −0.0333 | −0.17 |
| d6 | 4.31 | 3.53 | 0.89 |
| d14 | 10.19 | 10.11 | 9.16 |

[Values for Conditional Expressions]

(1): −f1/f2 = 1.39
(2): n1p = 1.904
(3): ν1p = 31.3
(4): Δ3/Δ2 = 1.30
(5): −f1/f3 = 3.27
(6): f2/f3 = 2.35
(9): n1p = 1.904

Figure 6A:
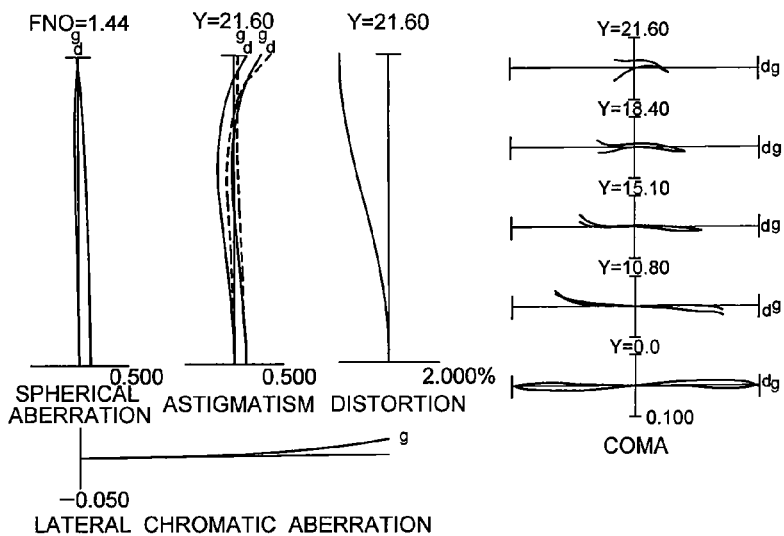
Figure 6B:
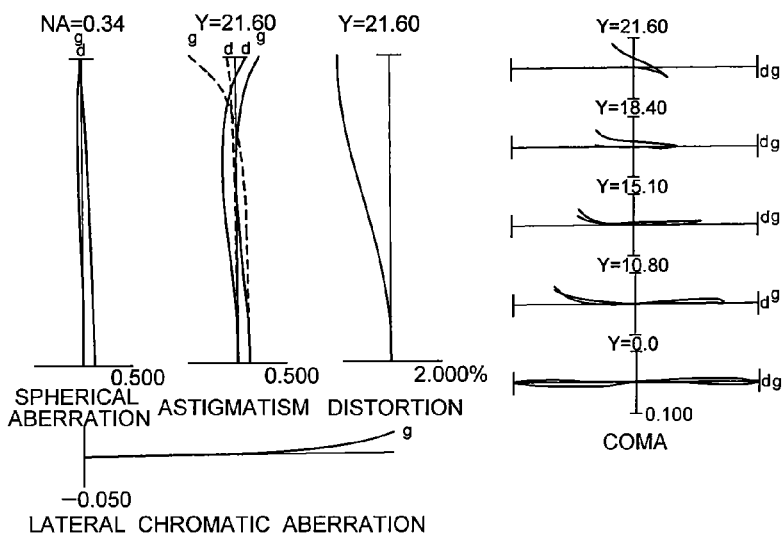
Figure 6C:
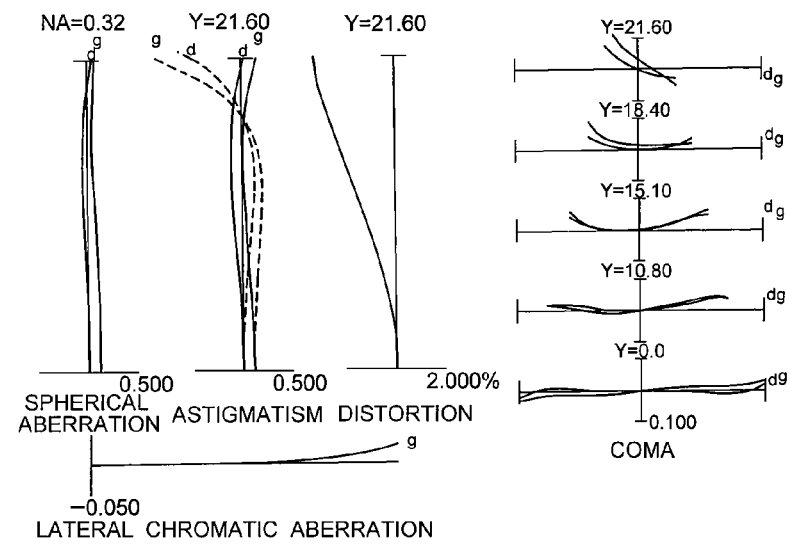

FIGS. 6A, 6B and 6C are graphs showing various aberrations of the wide-angle lens according to Example 3, in which FIG. 6A shows upon focusing on infinity ($\beta$=0.00), FIG. 6B shows upon focusing on an object locating at an intermediate distance ($\beta$=−0.033), and FIG. 6C shows upon focusing on an object locating at the closest distance ($\beta$=−0.20).

As is apparent from the respective graphs, the wide-angle lens according to Example 3 shows superb optical performance as a result of good corrections to various aberrations.

As described above, the present embodiment makes it possible to provide a wide-angle lens having an angle of view of 80 degrees or more, a large aperture with an f-number of about 1.4, and high optical performance, suitable for a single-lens reflex camera and a digital camera.

Then, a camera equipped with a wide-angle lens according to the present embodiment is explained. Although a case that the wide-angle lens according to Example 1 is installed is explained, the same result is obtained by the other Examples.

Figure 7:
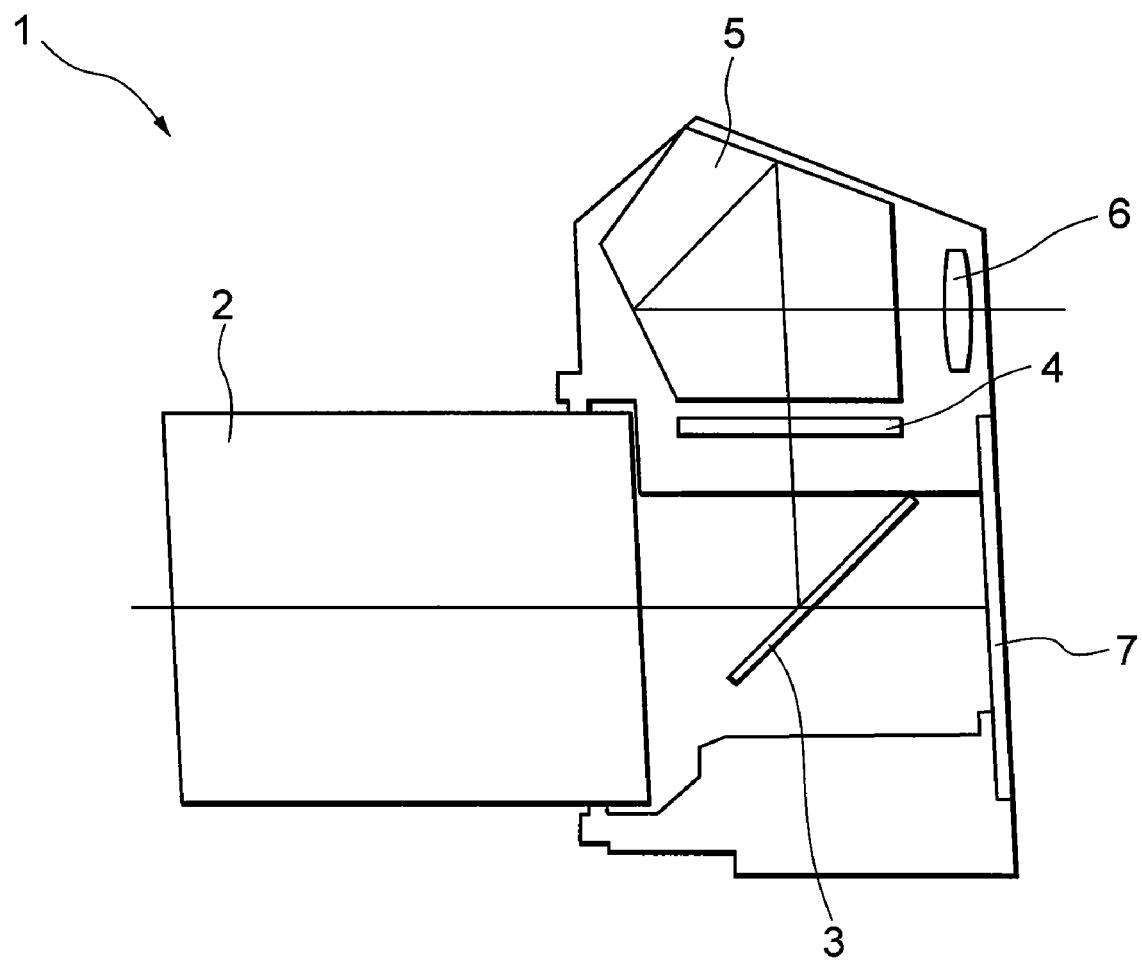
FIG. 7 is a graph showing a camera equipped with the wide-angle lens according to Example 1.

FIG. 7 is a schematic diagram showing a camera equipped with the wide-angle lens according to Example 1 of the present embodiment.

As shown in FIG. 7, the camera 1 is a single-lens reflex digital camera equipped with the zoom lens system according to Example 1 as an image-taking lens 2. In the camera 1, light emitted from an object (not shown) is converged by an image-taking lens 2, and focused on a focusing screen 4 through a quick return mirror 3. The object image focused on the focusing screen 4 is reflected a plurality of times by a pentagonal roof prism 5, and led to an eyepiece 6. Therefore, a photographer can observe the object image as an erected image through the eyepiece 6.

When the photographer presses a shutter release button (not shown), the quick return mirror 3 is retracted from an optical path, and the light from the object (not shown) reaches an imaging device 7. Accordingly, light emitted from the object is captured by the imaging device 7 and stored in a memory (not shown) as an object image. In this manner, the photographer can take a picture of an object by the camera 1.

With installing the wide-angle lens according to Example 1 of the present embodiment into the camera 1 as an image-taking lens 2, it becomes possible to realize a camera having high optical performance.

Incidentally, the following description may suitably be applied within limits that do not deteriorate optical performance.

Although a wide-angle lens with a three-lens-group configuration is shown as each Example of the present embodiment, the present embodiment can be applied to other lens-group configurations such as a four-lens-group configuration, and a five-lens-group configuration. A lens configuration that a lens or a lens group is added to the most object side, or a lens or a lens group is added to the most image side may be applicable. Here, a lens group denotes a portion of lens configuration that includes at least one lens element and is separated by at least one air space which varies upon zooming.

In each Example, in order to carry out focusing from an infinity object to a close object, a portion of a lens group, a single lens group, or a plurality of lens groups may be moved along the optical axis.

The focusing lens group(s) may be used for auto focus, and suitable for being driven by a motor such as an ultrasonic motor. In a wide-angle lens according to the present embodiment, it is preferable that the second lens group and the third lens group is used for the focusing lens group. However, at least one of the second lens group and the third lens group, or all lens groups from the first lens group to the third lens group may be focusing lens groups.

A lens group or a portion of a lens group may be sifted in a direction having a component perpendicular to the optical axis as a vibration reduction lens group for correcting an image blur caused by a camera shake. As for shifting, rotational movement (swing) centered at a point locating on the optical axis may be applicable. It is particularly preferable that the third lens group or a portion of the third lens group is used as a vibration reduction lens group.

Moreover, any lens surface may be an aspherical surface. The aspherical surface may be fabricated by a fine grinding process, a glass molding process that a glass material is formed into an aspherical shape by a mold, or a compound type process that a resin material is formed into an aspherical shape on a glass surface.

Although an aperture stop is preferably disposed in the second lens group, the function may be substituted by a lens frame without disposing a member as an aperture stop.

An antireflection coating having high transmittance over a broad wavelength range may be applied to each lens surface to reduce flare or ghost images, so that high optical performance with a high contrast can be attained.

The present embodiment only shows a specific example for the purpose of better understanding of the present invention. Accordingly, it is needless to say that the invention in its broader aspect is not limited to the specific details and representative devices shown and described herein, and various modifications may be made without departing from the spirit or scope of the general inventive concept as defined by the appended claims and their equivalents.

What is claimed is:

1. A wide-angle lens comprising, in order from an object:
a first lens group having negative refractive power;
a second lens group having positive refractive power; and
a third lens group having positive refractive power;
the first lens group including a positive lens;
upon focusing from an infinity object to a close object, the first lens group being fixed, and the second lens group and the third lens group being moved to the object, and the following conditional expressions being satisfied:

$1.10 < -f1/f2 < 1.50$ $1.80 < n1p$ where f1 denotes a focal length of the first lens group, f2 denotes a focal length of the second lens group, and n1p denotes a refractive index of the positive lens in the first lens group at d-line in which wavelength $\lambda=587.6$ nm.

2. The wide-angle lens according to claim 1, wherein the following conditional expression is satisfied:

$30.00 < \nu1p$ where $\nu1p$ denotes an Abbe number of the positive lens in the first lens group at d-line in which wavelength $\lambda=587.6$ nm.

3. The wide-angle lens according to claim 1, wherein an aperture stop is disposed between the second lens group and the third lens group.

4. The wide-angle lens according to claim 1, wherein upon focusing from an infinity object to a close object, the second lens group and the third lens group are moved to the object with different moving amounts.

5. The wide-angle lens according to claim 4, wherein the following conditional expression is satisfied:

$1.10 < \Delta3/\Delta2 < 1.50$ where $\Delta3$ denotes the moving amount of the third lens group, and $\Delta2$ denote the moving amount of the second lens group.

6. The wide-angle lens according to claim 1, wherein the following conditional expression is satisfied:

$1.50 < -f1/f3 < 3.40$ where f3 denotes a focal length of the third lens group.

7. The wide-angle lens according to claim 1, wherein the following conditional expression is satisfied:

$1.50 < f2/f3 < 3.00$ where f3 denotes a focal length of the third lens group.

8. The wide-angle lens according to claim 1, wherein at least one of the first lens group and the second lens group has an aspherical lens.

9. The wide-angle lens according to claim 1, wherein the second lens group has a positive lens, and the following conditional expression is satisfied:

$1.90 < n2p$ where n2p denotes a refractive index of the positive lens in the second lens group at d-line in which wavelength λ=587.6 nm.

10. The wide-angle lens according to claim 1, wherein the second lens group has a positive lens, and the following conditional expression is satisfied:

$$30.00 < v2p$$

where v2p denotes an Abbe number of the positive lens in the second lens group at d-line in which wavelength λ=587.6 nm.

11. The wide-angle lens according to claim 1, wherein the following conditional expression is satisfied:

$$1.90 < n1p.$$

12. An optical apparatus equipped with the wide-angle lens according to claim 1.

13. A method for focusing a wide-angle lens comprising steps of:
providing the wide-angle lens including, in order from an object, a first lens group having negative refractive power, a second lens group having positive refractive power, and a third lens group having positive refractive power, the first lens group including a positive lens, the following conditional expressions being satisfied:

$$1.10 < -f1/f2 < 1.50$$

$$1.80 < n1p$$

where f1 denotes a focal length of the first lens group, f2 denotes a focal length of the second lens group, and n1p denotes a refractive index of the positive lens in the first lens group at d-line in which wavelength λ=587.6 nm; and
carrying out focusing from an infinity object to a close object by fixing the first lens group and moving the second lens group and the third lens group to the object.

14. The method for focusing the wide-angle lens according to claim 13, further comprising a step of:
satisfying the following conditional expression:

$$30.00 < v1p$$

where v1p denotes an Abbe number of the positive lens in the first lens group at d-line in which wavelength λ=587.6 nm.

15. The method for focusing the wide-angle lens according to claim 13, further comprising a step of:
moving the second lens group and the third lens group to the object with different moving amounts upon focusing from an infinity object to a close object.

* * * * *